United States Patent

Scarnato et al.

[15] 3,645,574
[45] Feb. 29, 1972

[54] FASTENING DEVICE

[72] Inventors: Thomas J. Scarnato, Barrington; Martin H. Meyer, Elburn; George B. Cicci, Broadview, all of Ill.

[73] Assignee: International Harvester Company, Chicago, Ill.

[22] Filed: Feb. 5, 1970

[21] Appl. No.: 8,798

[52] U.S. Cl. .................................. 292/242, 24/73 SB, 292/64
[51] Int. Cl. ............................................. E05c 3/10, E05c 5/02
[58] Field of Search ................... 292/195, 202, 242, 241, 256, 292/57, 60, 61, 62, 5, 6, 64; 24/73.8 S, 73.8 SP, 221 K, 243 LP; 85/DIG. 3

[56] References Cited

UNITED STATES PATENTS

| | | |
|---|---|---|
| 2,409,822 | 10/1946 | Allen .................................. 292/241 |
| 1,193,148 | 8/1916 | Hornung .............................. 292/57 |
| 2,502,539 | 4/1950 | Tinnerman ......................... 292/202 |
| 2,246,344 | 6/1941 | Calderwood ........................ 292/62 |
| 2,515,507 | 7/1950 | Glifsch ............................... 292/195 |
| 3,302,964 | 2/1967 | Barry .................................. 292/57 |

Primary Examiner—George F. Mautz
Assistant Examiner—Edward J. McCarthy
Attorney—Noel G. Artman and Floyd B. Harman

[57] ABSTRACT

A fastener for securing a hinged door against an adjacent panel and mountable on one of the door and the panel, the fastener being selectively positionable to coact with its mounting to clasp a portion of the other of the door and the panel, wherein the holding force securing the door is nearly constant over a wide range of thicknesses of the portion clasped.

1 Claims, 7 Drawing Figures

Patented Feb. 29, 1972
3,645,574
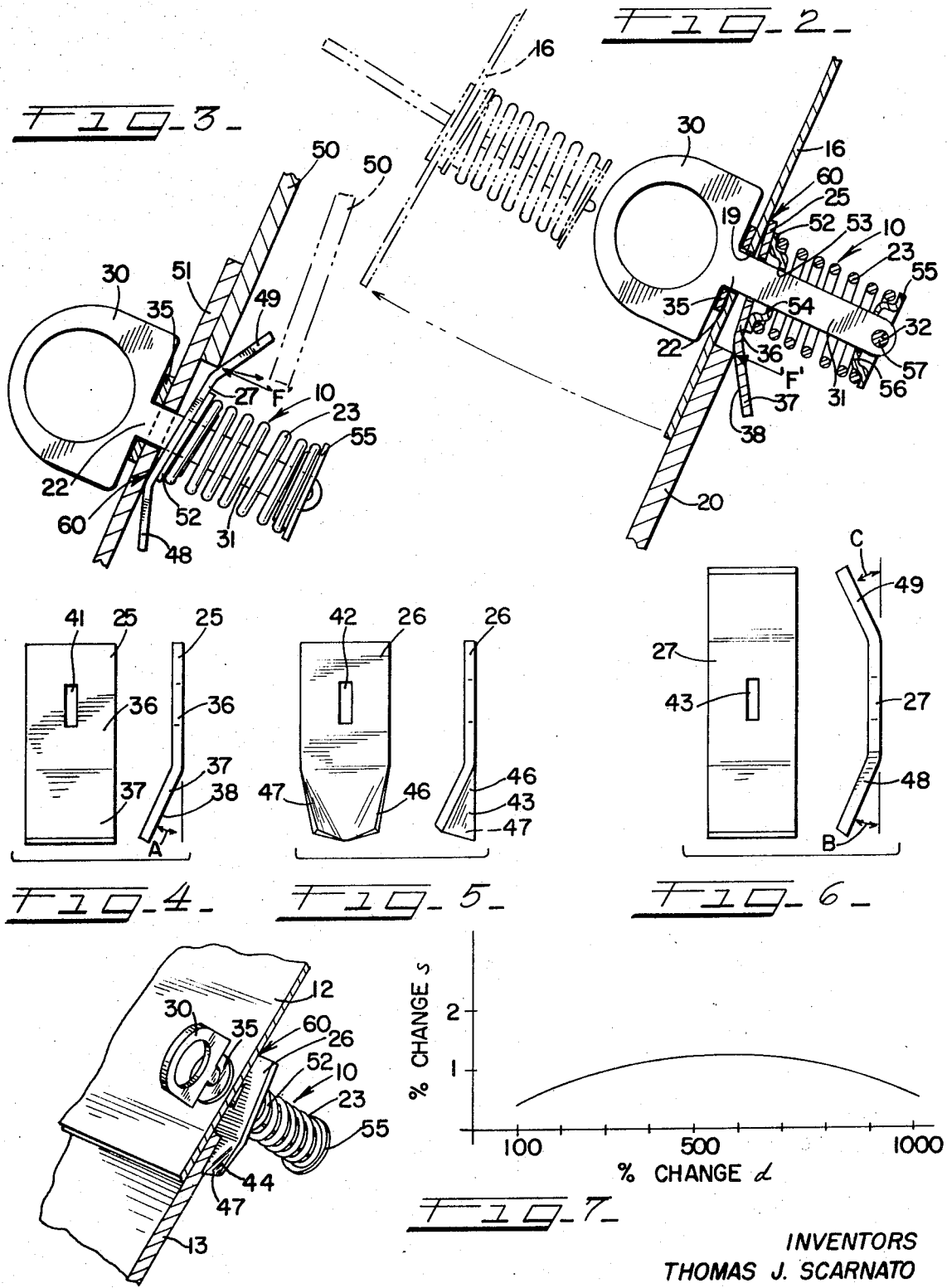
INVENTORS
THOMAS J. SCARNATO
MARTIN H. MEYER
GEORGE B. CICCI
BY John J. Kowalik
ATT'Y.

FASTENING DEVICE

BACKGROUND OF THE INVENTION

The instant invention to which this disclosure relates is particularly directed toward the securing of hinged compartment doors to associated panel structures by a manually operable fastening device that is easy to assemble and inexpensive to manufacture, but yet have predictably door securing characteristics over a wide range of panel thicknesses.

The fasteners commercially available at the present tend to be expensive and/or are not suitable for use in a multitude of situations without substantially modifying the latch mechanism or it's environmental setting. This requires a manufacturer, who in the course of their business, continually change the design of their products, to be faced with the problem of acquiring and maintaining an inventory of specific latch mechanisms for particular applications.

The instant invention has been created to lessen the effect of the above-mentioned problem. The novel fastener hereinafter described can be fabricated from inexpensive materials readily assemblable with minimal labor expense to result in a device capable of securing a hinged door in position with a substantially constant holding force even though design considerations may require the part grasped by the fastener to vary over a wide range of thicknesses. It can be appreciated that such a fastener having a predictable securing force when so employed can be utilized in numerous applications with minimal acquisition and inventory costs.

A general object of the invention is to provide a fastener for securing a hinged door in position to an adjacent panel wherein the fastener coacts with its mounting to produce a grasping action operative to secure the door to the panel.

Another object of the foregoing is to provide a fastener which produces a securing force which remains nearly constant over a wide range of thicknesses of a member grasped.

A still further object of the invention is to provide a fastener mountable on one of the doors or the panel and positionable in grasping relation to a portion of the other of the door and the panel to produce a securing force substantially constant over a wide range of thicknesses of the portion clasped.

Another object of the invention is to provide that the fastener include an arm mountable on one of the doors and the panel and rotatable to a selected position where thereat the arm coacts with the mounting by pivoting thereon to produce a clasping relationship on one of the other of the door and the panel to secure the door.

A further object of the foregoing is to provide that the arm have an inclined surface to facilitate a positioning thereof on one of the other of the doors and the panel to secure the door.

A still further object of the foregoing is to provide that the fastener have a handle and biasing means associated therewith to produce the securing force on the arm wherein the handles act as a reactive member for that force.

BRIEF DESCRIPTION OF THE DRAWING

FIG. 1 is a perspective view of the fastener with parts cut away;

FIG. 2 is an elevational sectional view of the fastener mounted on a hinged door;

FIG. 3 is an elevational and sectional view of the fastener mounted on a panel adjacent a hinged door;

FIG. 4 is a plan and elevational view of a first embodiment of a reactive latch arm of the fastener;

FIG. 5 is a plan and elevational view of a second embodiment of a reactive latch arm of the fastener;

FIG. 6 is a plan and elevational view of a third embodiment of a reactive latch arm of the fastener; and FIG. 7 is a sketch of a graph representing the calculated securing characteristics of a sample fastener.

DESCRIPTION OF THE PREFERRED EMBODIMENT

Referring to FIG. 1, there is shown the instant invention, namely a fastener generally designated 10, mounted on a member 12 disposed in an abutting relation to another member 13. It should be noted that the fastener 10 is positionable to operatively secure the members 12 and 13 together. The members are shown in part and it can be appreciated that such members could be arranged that one would swing to abut against the other or both could be hinged to swing together in an abutting position as illustrated in the FIG. 1.

FIG. 2 shows the fastener mounted on a hinged door 16 and FIG. 3 shows the same fastener mounted on a fixed panel 51 for securing a door 50 thereto. The FIGS. 1, 2 and 3 are meant to illustrate at least those more common situations on which the fastener is operative as a securing device and therefore the same reference numerals will be used in those figures where parts are essentially identical. It is to be understood that the following description of the fastener 10 of FIG. 2 showing a mounting on a door is merely a vehicle for disclosing the instant invention and that the same inventive concepts and principles apply when the fastener 10 is mounted on a fixed or movable panel for securing an adjacent door.

Referring in detail to FIG. 2, it can be seen that the fastener 10 is mounted on the door 16 which is swingably supported on a compartment member (not shown). The fastener is mounted on the door 16 through a hole 19 located therein whereby the fastener is located in position to secure the door to an adjacent fixed panel 20.

The fastener comprises an actuating frame 22 mounting a spring 23 which serves to provide a force to an associated reactive latching member or arm 25, 26 or 27, shown in FIGS. 4, 5 and 6 respectively. The fastener in FIG. 1 shows the latching arm 26 mounted in position on the fastener; in like manner latching members 25 and 27 have been shown mounted on the fasteners as illustrated in FIGS. 2 and 3 respectively. It should be noted any one of the latching members (25, 26, 27) could be used in any one of the environmental settings shown.

The actuating frame 22 comprises a handle 30 which is integral with a shank portion 31 extending therefrom and having a hole 32 in its distal end. The shank has a rectangular cross section along its extent for reasons which will be discussed hereinafter.

The shank portion 31 of the handle is passed through the hole 19 in the door with the hole fabricated to have sufficient clearance so that the shank portion can easily be rotated therein. A wear washer 35 is placed between the handle 22 and the door 16 providing a wearing surface on which the handle rotates; this washer 35 also serves to maintain the handle in spaced relation to the fastener's mounting.

The latching arm 25 is made from a flat metal strip bent at an angle A to form a flat portion 36 on which the force developed by spring 23 acts. Extending from the flat portion is an angled segment 37 which, when in position, extends outwardly from the door to provide an inclined surface 38 which is disposed to engage and ride onto the panel 20 upon actuation of the fastener 10. It can be seen in FIGS. 4, 5 and 6 that each latching member 25, 26 and 27 has an essentially identical rectangularly shaped slot 41, 42 and 43 respectively. Each of these slots has a width sufficiently larger than the thickness of the shank portion 31 of the actuating part to provide clearance in order that the latching member or arm can easily move in longitudinal directions along the shank portion. The length of the slots (41, 42, 43), however, are substantially longer than the width of the shank portion 31 to provide the necessary clearance, so that as the fastener is actuated, the particular latching arm used, is free to move within planes radial of the principle axis of rotation of the shank portion. The latching member or arm 26 of FIG. 5 made from a flat metal strip having one end thereof bent into a V-shape as shown. This produces a pair of similar beveled flanges 43 and 44 effective to produce inclined plane surfaces 46 and 47 respectively arranged thereon for engaging the panel 20 of FIG. 2 or door 50 of FIG. 3. The latching member 27 is also made of a flat metal strip having each end thereof bent at angles B and C thereby forming angled segments 48 and 49, respectively. These segments serve the same function as segment 37 of member 25 with the added advantage of enabling the positioning of the fastener in two separate securing positions by engaging the door (or panel) every 180° turn of the handle 30. Also angles B and C can be of different values thereby providing a means for selectively choosing a different value of securing force of the fastener effective on the panel by selectively positioning the segments 48 and 49 in securing positions by merely rotation of the handle 30.

The latching member is sleeved onto the shank portion as seen in either of the FIGS. 1, 2 and 3. A dished washer 52 having a centering cup with a hole 53 therein slightly larger than the maximum cross-sectional dimension of the shank portion 31 is then freely passed over the shank portion with its centering cup 54 facing outwardly from the latching member. The spring 23 is then placed over the shank portion and onto the dished washer 52. It should be observed that the cup 54 and the inner periphery of the spring 23 dimensionally compliment one another in order that that end of the spring is retained in axial alignment about the shank portion 31.

Another dished washer 55 having a centering cup 56 and being essentially identical to the washer 52 is placed on the other end of the spring 23 and sleeved onto the shank portion 31. This requires compressing the spring 23 to effect an initial loading force thereof. A cross pin 57 is placed through the hole 32 in the end of the shank portion and is held captive in position within the concavity of the centering cup 56 by the loading force of the spring. The centering cup 56 also serves to retain that end of the spring in axial alignment about that end of the shank portion.

The free length of the spring is greater than the shank portion 31 in order that the spring 23 will provide an initial loading force on the latch members (25, 26, 27); such force being a function of the distance the spring is deflected and its load-stress characteristics. It can be seen that the spring at one end provides a force against the crosspin 57 which in turn draws the handle 30 against its mounting, i.e., the door 16 (or panel 51 of FIG. 3). The other end of the spring provides a force against the latching member wherein the door and the latching member are held against one another by a predetermined force in such a manner that they coact and form a jawlike structure.

The fastener is operated by turning the handle 30 in either a clockwise or counterclockwise direction to a securing position. This is effected by correspondingly rotating the latching member (25, 26 or 27) to an engaging position on the panel 20 (or door 50) as shown in FIGS. 2 and 3 respectively. It can be seen that this action causes the angled or beveled portion of the latching members to be forced off the fastener's mounting producing a third class lever system wherein the latching member acts as a lever which pivots at a particular place 60 on the door 16 (or panel 51). At this time the angled or beveled portion of the latching member engages the panel 20 (or door 50) at a place of contact thereon. The latching member thereby coacts with door 16 (or the panel 51, whichever is it's mounting) to grasp or clasp the adjacent panel 20 (or door 50 of FIG. 3). A securing force 'F' depicted by an arrow in FIG. 2 is defined as the component of force exerted by the latching member normal to the panel at the place the latching member engages the panel 20. The percent change in force 'F' has been calculated to vary only a small amount over a wide range of percent change in thickness of the panel (or door) grasped by the coaction of the fastener and its mounting. For as the panel (or door) thickness varies so does the amount of force exerted by the spring 23 on the latching member vary due to the pivoting of the latching member at the place of pivot thereby causing an axial displacement and compression of the spring 23. The amount of force is dependent on the amount of displacement and the spring rate of the spring 23.

Such a small percent change in securing force 'F' over wide ranges of panel thicknesses can be illustrated by a typical example. The approximate equation for the securing force can be expressed as $F = S A \cos X / B$ where 'S' is the initial loading and increased loading due the axial displacement of the spring 23 because of the panel (or door) thickness; 'B' being the distance from the place of pivot 60 to the panel (or door); 'A' being the distance from the place of pivot 60 to the place on the latching member where the force 'S' is exerted; and the angle $X$ being the included angle between the latching member (25, 26, 27) and its mounting (door or panel) at the place of pivot 60 caused by the panel (or door) thickness. A typical example where the initial loading by the spring on the latching member was taken as 30 pounds with the spring having a spring rate of 10 pounds per inch, 'B' is 2 inches, 'A' is one-half (0.5) inches and the panel or door thickness varies from 0.05 to 0.5 inches, it can be shown by calculations that for percent changes in panel (or door) thickness of 1,000 percent the percent change in securing force 'F' varies less than 2 percent. A graph representing the calculated results of the aforementioned example where percent changes in 'S' vs. percent changes in panel (or door) thickness depicted $d$ is shown at FIG. 7. It can be appreciated that such a fastener 10 can be utilized in a great many applications with uniform results without the need to change or alter the components thereof.

It also should be noted that the included angles A, B or C at which the segments 37, 48 and 49 of the latching members 25, 27 respectively are bent have the effect of varying the securing force 'F' by an essentially constant term having a value of the cosine of those included angles (A, B or C). By merely varying such angles the value of the nearly constant holding force 'F' can be adjusted without the need of selecting different springs having different spring rate characteristics or changing the length of the shank portion 31. Another advantage of the fastener when the latching member 27 is used is that a different holding force 'F' can be selected by making the angles B and C of the segments 48 and 49 different, such that one desired quantum holding force is selected when the handle 30 is rotated to one securing position and another desired quantum of holding force can be selected by rotating the handle to the other securing position. It is also contemplated that a latching member could be constructed which had a plurality of differently angled segments which could be easily removable in order to easily select a desired holding force value from a single piece part.

It will be appreciated that the embodiment of the invention chosen for the purposes of illustration and description herein is that preferred based upon requirements for achieving the objects of the invention and developing the utility thereof in the most desirable manner, due regard being had to existing factors of economy, simplicity of design and construction, production methods and the improvements sought to be effected. It will be understood, that the particular structure and functional aspect emphasized herein are not intended to exclude but rather to suggest such other modifications and adaptions as fall within the spirit and scope of the invention as defined in the appended claims.

What is claimed is:

1. A fastener for releasably holding together separable opposed faces respectively of a door edge portion and of a panel edge portion and being operable to grasp such an edge portion with a securing force nearly constant relative to a wide range of thicknesses of that edge portion grasped, comprising: a handle having a shank extending through an aperture in one of said edge portions and rotatable therein to selectively position the fastener in a securing position or a release position; a latching member mounted on said shank for rotation therewith and movable thereon to coact with said one edge portion to grasp the other edge portion to secure the door to the panel upon rotation of the handle to the securing position and attendant to said latching member being pressed against the other edge portion; biasing means comprising a compression spring operatively disposed between the shank and the latching member and acting thereon to press the same against the other edge portion with a force which is a function of the nearly constant securing force, and said latching member comprising a slot therein to sleeve mount said member onto said shank in a position contiguous to said one edge portion wherein said member is constrained to rotate therewith and free to move in a plane parallel with the principle axis of the shank as the latching member pivots in attaining the securing and release positions, said latching member including cam means to facilitate movement thereof to the securing position, said slot and shank being of complementary interfitting rectangular configuration, and the slot having a width dimensioned slightly greater than the thickness of the shank to closely engage the sides of the shank, said slot being of greater elongate dimension than the width of the shank to accommodate canting movements of the latching member in said plane axially of the shank attendant to movement between securing and released positions, and said latching member having one end bearing against the one edge portion and in the securing position bearing at its other end against the other edge portion, and said compression spring seated at one end against said latching member which comprises a seating surface for the spring extending diagonal to its axis whereby the loading on the spring is diagonal to its axis.

* * * * *